United States Patent [19]
Connors et al.

[11] 3,894,768
[45] July 15, 1975

[54] SEAT BELT ASSEMBLY

[75] Inventors: David G. Connors, Plymouth; Arild O. Saethre, Troy, both of Mich.

[73] Assignee: Ford Motor Company, Dearborn, Mich.

[22] Filed: July 1, 1974

[21] Appl. No.: 484,897

[52] U.S. Cl. ......... 297/389; 24/230 R; 24/230 AU; 24/265 R
[51] Int. Cl.²...A44B 11/25; A47C 31/00; A44C 5/18
[58] Field of Search .. 24/230 AU, 230 NP, 230 AL, 24/230 R, 73 PH; 297/389; 280/150 SB

[56] References Cited
UNITED STATES PATENTS

| | | | |
|---|---|---|---|
| 1,834,046 | 12/1931 | Brooks | 24/265 AL |
| 2,170,703 | 8/1939 | Wayman | 297/389 |
| 3,247,563 | 4/1966 | Guerrero | 24/230 AV |
| 3,279,072 | 10/1966 | Gold | 24/73 PH |
| 3,418,007 | 12/1968 | Jantzen | 297/389 |
| 3,426,985 | 2/1969 | Pravaz | 24/205.17 |
| 3,538,558 | 11/1970 | Croft | 24/230 AL |
| 3,841,659 | 10/1974 | Peel | 297/389 |

Primary Examiner—Bernard A. Gelak
Attorney, Agent, or Firm—John J. Roethel; Keith L. Zerschling

[57] ABSTRACT

A seat belt assembly comprising a tongue plate having a buckle latch engaging portion and a webbing receiving portion. The webbing receiving portion has slot means through which ends of a lap belt and a shoulder harness webbing have been threaded. Each webbing end after having been threaded through the slot means has been folded against and stitched to its webbing. This results in permanent loops coupling the webbings to the tongue plate.

The improvement comprises an elongated slot extending from the end of the buckle latch engaging portion of the tongue plate toward the other end of the latter and intersecting the slot in the webbing receiving portion. The auxiliary slot provides a passageway through which a webbing loop may be passed for disassembly of a webbing from the tongue plate.

Preferably, a displaceable means affixed to the tongue plate straddles the auxiliary slot and blocks passage of a loop therethrough.

2 Claims, 2 Drawing Figures

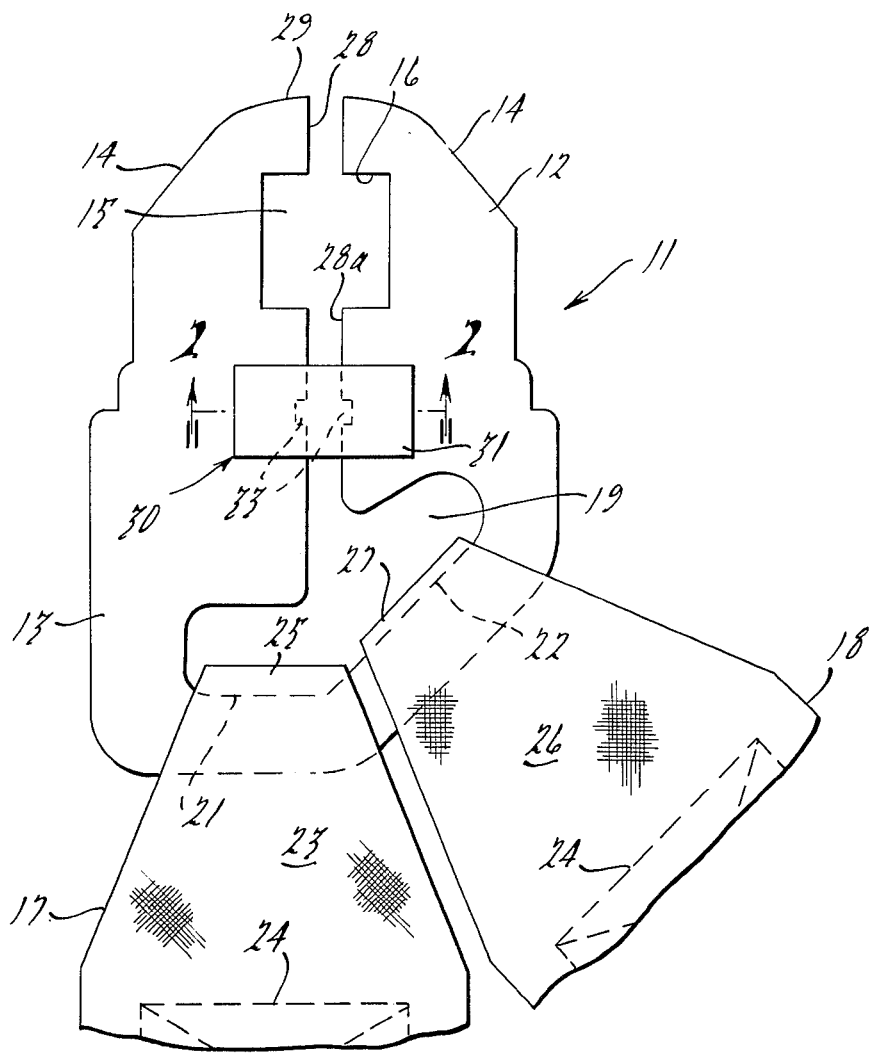
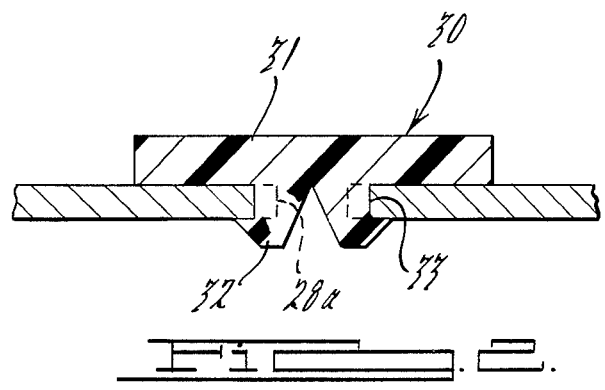

SEAT BELT ASSEMBLY

BACKGROUND OF THE INVENTION

Three-point seat belt systems as are currently used to restrain the vehicle operator and the outboard front seat passenger are of the "must wear" type. That is, both the shoulder harness webbing and the lap belt webbing are permanently coupled to a common tongue plate that is engagable with a buckle latch mechanism. Since both webbings are coupled to a common tongue plate, it is necessary that both the shoulder harness webbing and lap belt webbing be fitted around the seat occupant before the seat belt assembly can be buckled.

The shoulder harness and lap belt webbings conventionally are each anchored to the vehicle body through separate retractor mechanisms. The two retractor mechanisms and the shoulder harness and lap belt webbings are preassembled and installed as a unit in the vehicle body. This has one disadvantage. If either retractor mechanism has to be removed for repairs or replacement, both mechanisms must be removed.

It is an object of the present invention to permit uncoupling of at least one webbing from the tongue plate so that only the retractor mechanism requiring repair or replacement need be removed from the vehicle body.

SUMMARY OF THE INVENTION

The present invention relates to a seat belt assembly comprising a tongue plate having a buckle latch engaging portion and a slotted webbing receiving portion. Associated with the tongue plate are a lap belt and a shoulder harness webbing, the ends of which, respectively, have been threaded through the slot in the webbing receiving portion. Each webbing end, after having been threaded through the slot and then folded against its webbing, is stitched to the webbing into a permanent loop coupled to the tongue plate.

The improvement comprises an elongated auxiliary slot extending from the end of the buckle latch engaging portion of the tongue plate toward the other end of the latter and intersecting the slot in the webbing receiving portion. The elongated auxiliary slot provides a passageway through which a loop may be passed for disassembly of a webbing from the tongue plate without destroying the integrity of the stitching forming the webbing loop.

Preferably, a displaceable means affixed to the tongue plate straddles the auxiliary slot and blocks passage of a loop therethrough.

DESCRIPTION OF THE DRAWING

Further features and advantages of the present invention will be made more apparent as this description proceeds, reference being had to the accompanying drawing, wherein:

FIG. 1 is a plan view of a seat belt system tongue plate having the loop ends of lap belt and shoulder harness webbings connected thereto; and FIG. 2 is a view on the line 2—2 of FIG. 1.

DETAILED DESCRIPTION OF THE INVENTION

Referring now to the drawing, there is shown in FIG. 1 a seat belt system tongue 11 in the form of an elongated plate having a buckle mechanism latch engaging portion 12 and a webbing receiving portion 13.

The latch engaging portion 12, which for convenience may be referred to as the front end of the tongue, has tapered side edges 14 that function as a pilot for guiding the tongue into a buckle device (not shown). The tongue plate 11 has an aperture 15 the front edge 16 of which is adapted to act as a keeper to be engaged by a latch element of the buckle device.

The webbing receiving portion 13 of the tongue 11 is provided with a slot means through which ends of a lap belt webbing 17 and a shoulder harness webbing are threaded. The slot means comprises an angular slot 19 having one edge 21 extending in a substantially normal direction to the longitudinal axis of the tongue 11 and a second edge 22 angularly forwardly inclined relative to the edge 21. This is to accommodate the lap belt which normally extends longitudinally of the buckle and the shoulder harness which is connected to the tongue at an angle. The latter is draped across the seat occupant at an angle compared to the lap belt which extends around the waistline of the seat occupant.

An end 23 of the lap belt webbing 17 is threaded through the slot 19 and is folded over the edge 21 back against the main portion of the webbing and permanently stitched thereto as indicated at 24. This forms the webbing into a permanent loop. The extremity 25 of the folded webbing end 23 is tucked inwardly and stitched (the stitching not being visible) to give a double material thickness adapted to bear against the slot edge 21 of the slot 19 when the lap belt is placed under tension.

The end 26 of the shoulder harness webbing 18 is threaded similarly through the slot 19 with its folded extremity 27 bearing against the slot edge 22.

The foregoing describes the construction and arrangement of the tongue-end of a lap belt webbing and a shoulder harness webbing as currently used in a three-point seat belt system. The other end of each webbing is coupled to a separate retractor mechanism mounted on vehicle body structural members. In the event of a retractor mechanism failure, it is necessary to remove both retractor mechanisms since they are permanently connected to each other through the permanent relationship of their respective webbings to the common tongue.

The tongue plate 11 embodying the present invention is provided with an auxiliary slot 28 that has a first section which extends from the tip end 29 of the tongue plate longitudinally of the latter into the latch receiving aperture 15 and then a second section 28a that extends beyond the latter into the webbing receiving slot 19. This slot 28–28a is of sufficient width so that either webbing loop 23 or 26 may be manipulated to pass through the slot and thus permit separation of either webbing from the tongue 11. Accordingly, only the inoperative retractor mechanism must be dismounted from the vehicle body structure for repair or replacement.

It is desirable, however, to discourage disconnection of either webbing from the tongue plate 11 except when necessary for repair or replacement purposes. Although the width of the slot 28–28a is such that it offers some resistance to passage of a webbing, preferably a blocking means straddling the slot is best utilized to block such passage. The blocking means is illustrated as a plastic insert 30 having a flat body portion 31 and depending legs or protuberances 32. The legs 32 are snap-fit into recesses 33 in the plate laterally offset from the slot 28a edges. The plastic insert may be removed from the tongue 11 by merely compressing or flexing the protuberances or legs 32 toward each other in order that they may be pushed through the recesses 33.

It is to be understood that this invention is not limited to the exact constructions illustrated and described above, but that various changes and modifications may be made without departing from the spirit and scope of the invention as defined by the following claims.

We claim:
1. A seat belt assembly comprising:
a tongue plate having a buckle latch engaging portion and a slotted webbing receiving portion,
a lap belt and a shoulder harness webbing the ends of which, respectively, have been threaded through the slot in the webbing receiving portion,
each webbing end after having been threaded through the slot being folded against and stitched to the webbing into permanent loops assembled to the tongue plate,
wherein the improvement comprises:
an elongated auxiliary slot extending from the end of the buckle latch engaging portion of the tongue plate toward the other end of the latter and intersecting the slot in the webbing receiving portion,
the elongated slot providing a passageway through which a loop may be passed for disassembly of a webbing from the tongue plate without destroying the integrity of the stitching forming the webbing loop,
a displaceable means fixed to the tongue plate straddles the slot and blocks passage of the loop therethrough.

2. A seat belt assembly according to claim 1, in which:
the displacement means comprises a plastic insert having retention elements projecting through the slot for retaining the insert in position.

* * * * *